United States Patent [19]

Cullick et al.

[11] Patent Number: 4,984,635
[45] Date of Patent: Jan. 15, 1991

[54] THERMAL BARRIERS FOR ENHANCED OIL RECOVERY

[75] Inventors: Alvin S. Cullick; Randy D. Hazlett, both of Dallas, Tex.

[73] Assignee: Mobil Oil Corporation, Fairfax, Va.

[21] Appl. No.: 437,418

[22] Filed: Nov. 16, 1989

[51] Int. Cl.$^5$ .................... E21B 33/138; E21B 43/24; E21B 43/243

[52] U.S. Cl. .................................. 166/261; 166/270; 166/272; 166/288; 166/295; 166/303

[58] Field of Search ............... 166/261, 258, 270, 272, 166/273, 274, 288, 295, 300, 303; 523/130

[56] References Cited

U.S. PATENT DOCUMENTS

| | | | |
|---|---|---|---|
| 3,349,843 | 10/1967 | Huitt | 166/272 X |
| 3,674,092 | 7/1972 | Bandyopadhyay | 166/272 X |
| 3,956,439 | 5/1976 | Hansel | 166/295 X |
| 4,264,486 | 4/1981 | McLaughlin | 166/295 X |
| 4,484,468 | 11/1984 | Gau et al. | 73/60 |
| 4,665,986 | 5/1987 | Sandiford | 166/295 X |
| 4,676,318 | 6/1987 | Myers et al. | 166/300 X |
| 4,761,099 | 8/1988 | Mann et al. | 166/295 X |
| 4,804,043 | 2/1989 | Shu et al. | 166/288 X |
| 4,830,108 | 5/1989 | Hazlett et al. | 166/300 X |
| 4,844,163 | 7/1989 | Hazlett et al. | 166/295 X |
| 4,848,465 | 7/1989 | Hazlett | 166/309 X |

Primary Examiner—George A. Suchfield
Attorney, Agent, or Firm—Alexander J. McKillop; Charles J. Speciale; Charles A. Malone

[57] ABSTRACT

A process is described to direct heat towards a productive interval of a reservoir during a thermal enhanced oil recovery (EOR) operation. A chemical composition suitable for producing a rigid polymer foam is injected above or below the productive interval. Once in place the temperature of the composition is increased and it reacts to produce a foamed polymer thermal barrier. The temperature can be increased by steam injection or in-situ combustion. After a rigid foam is formed, thermal efficiency is increased by reducing heat losses to non-producing zones during a thermal stimulation.

15 Claims, 1 Drawing Sheet

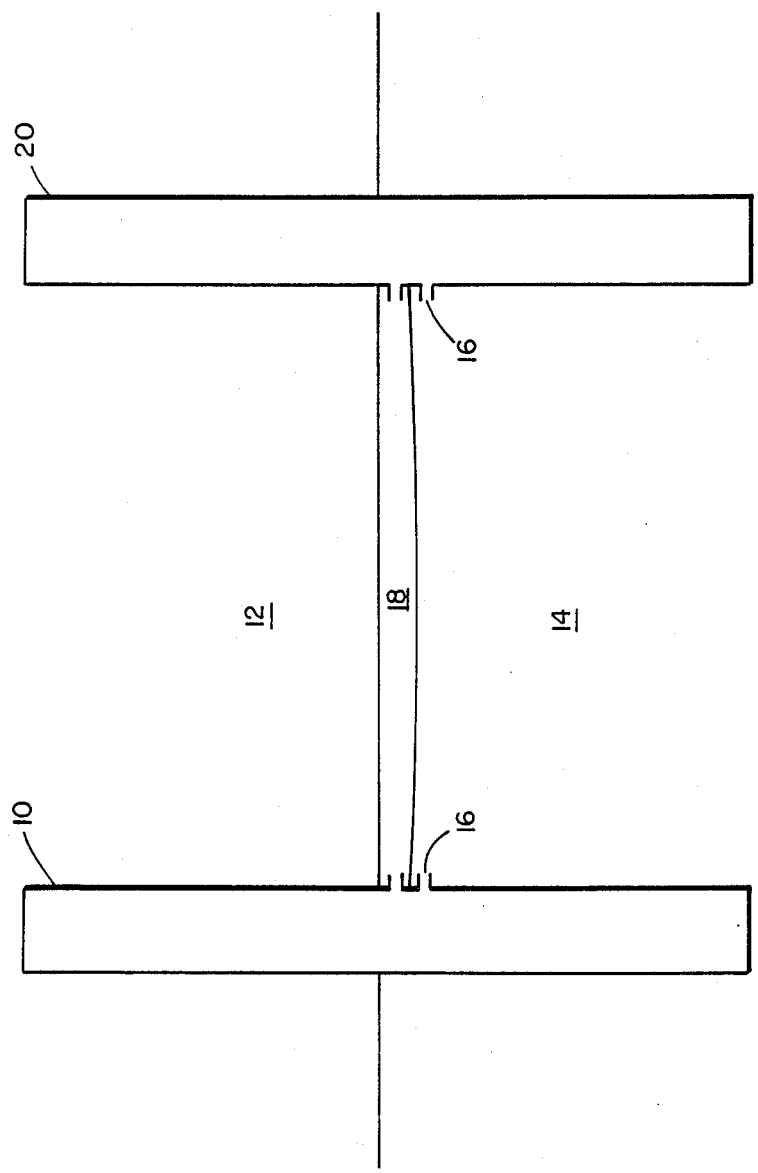

THERMAL BARRIERS FOR ENHANCED OIL RECOVERY

FIELD OF THE INVENTION

This invention is related to methods for increasing the efficiency of thermal enhanced oil recovery methods.

BACKGROUND OF THE INVENTION

The efficiency of many thermal projects is a strong function of heat losses to non-productive reservoir regions, referred to as overburden or underburden zones. This heat loss is especially significant in thin reservoirs. The magnitude of heat loss depends on the productive interval thickness and the thermal conductivity of the reservoir. Thermal conductivity is a function of the rock minerals, the degree of consolidation, the wetted state of the rock, and the saturation level of the fluids in the rock. Conservation of heat directed into a formation increases the efficiency of petroleum or hydrocarbon fluids recovery.

Therefore, what is needed is a method to direct heat towards productive intervals of a reservoir so as to recover increased amounts of petroleum or hydrocarbon fluids.

SUMMARY

This invention is directed to a method for reducing thermal conductivity and heat loss between zones of a formation or reservoir. To accomplish this, a foamable mixture is placed into at least one first zone of a formation adjacent to a second zone that can undergo thermal stimulation. The mixture which is placed into the first zone is sufficient to form a rigid foamed layer. This mixture is made up of a thermosetting resin and a means for foaming the resin. This mixture is allowed to remain in the second zone for a time sufficient for said mixture to react and form a rigid foam. This reaction occurs as a result of a temperature rise in the second zone that causes the foamable mixture to form a rigid foamed layer which layer is sufficient to reduce thermal conductivity and heat loss from said second zone.

It is therefore an object of this invention to direct heat towards productive intervals of a formation or reservoir.

It is another object of this invention to place a thin layer of foamed insulative material between a nonproductive zone adjacent to a productive zone undergoing thermal stimulation so as to reduce heat conduction and transfer away from a productive zone or interval containing hydrocarbon fluids.

It is still another object of this invention to provide for an insulative material which can withstand typical thermal enhanced oil recovery temperatures.

It is yet still another object of this invention to utilize a polyisocyanate prepolymer which in combination with polyol or water can react in a reservoir so as to reduce water saturation and thereby lower the effective thermal conductivity.

It is a further object of this invention to provide for a rigid foam insulative material which can be formed in situ as a result of a high temperature in a formation.

It is an even yet further object of this invention to provide for a block quasi-prepolymer foam composition which can have its reaction delayed until reaching a desired position in a reservoir or is subjected to increased temperature from subsequent thermal stimulation.

It is a still yet even further object of this invention to provide for foamable reactants in a mixture which can either reduce the water wetness in a formation so that water can be displaced more readily or react with water to reduce water saturation in a formation.

BRIEF DESCRIPTION OF THE DRAWING

The drawing is a schematic representation of a formation in which a layer of foam has been laid down between a first and second interval of a formation.

DESCRIPTION OF THE PREFERRED EMBODIMENTS

In the practice of this invention, a foam or foamable prepolymer is injected into formation 14 via well 10. The foamable material or foam enters the formation via perforations 16 in wellbore 10. The prepolymer or foamable material which is injected into formation 14 is injected until such time as it enters perforations 16 on wellbore 20. Alternatively, the injection may be stopped sometime prior to entry into wellbore 20 so long as the desired area is covered to reduce heat transfer between formation intervals or zones. Once in the formation, the prepolymer or a foamable mixture is allowed to remain in the formation for a time sufficient for the temperature to rise and initiate a reaction of the prepolymer and reactants to cause a thermosetting polymer and gas to form. This polymer in combination with the reactants will form a rigid foam layer 18 in a formation 14 that will reduce heat transfer from thermally treated interval 14 into an interval in which it is not desired to raise the temperature.

The temperature of the formation can be raised by conducting a thermal enhanced oil recovery method in productive interval 14 such as steam injection or an in-situ combustion process. Heat generated from either process should be sufficient to raise the temperature in a manner to cause the prepolymer and reactants to react and form a rigid stiff foam which will provide a thermal barrier for the duration of the thermal enhanced oil recovery operation. Although as is shown in the drawing, the foam has been injected into a higher level of productive interval 14, it can also be injected at a lower level so as to keep from being transferred away from interval 14 where a thermal oil recovery process is taking place. The formed foam layer can be rigid or flexible depending upon the nature of the prepolymer, reactants and additives utilized in the mixture.

Polyurethane foams are preferred for utilization in this invention. They have a distinct advantage for use in water-wet medium. In a water-wet medium, conduction through aqueous wetting films can be substantial. Reducing the water saturation in a formation adds an important contribution to lowering the effective thermal conductivity. Thermal conductivity in unconsolidated and consolidated sandstones is proportional to the water saturation. To reduce heat loss, water saturation should be at a minimum and the water should be discontinuous. That is to say the water should not wet the rock, i.e. form a continuous phase in the formation. Strongly water-wet rock has a high connate water saturation that is continuous in the medium, whereas water in the same pore structure which is oil-wet would be discontinuous.

Thermal conductivity and heat loss is best controlled when the foam is rigid and has a relatively high gas content by volume. The high gas volume and the rigid structure of the foam causes it to have a low heat conductivity. Preferably the reactants utilized should either reduce the water wetness so that water can be displaced more readily, or actually react with water to reduce the water saturation. Rigid polyurethanes can be used to fulfill both requirements. Unlike non-rigid foams or foamed aqueous gels, rigid polymeric foams do not have a continuous aqueous film that is an effective thermal conductor. For this reason, non-rigid foams and foamed aqueous gels are not effective in reducing heat loss and may actually enhance heat loss.

Thermosetting foams which are used herein can either be formed ex-situ or in-situ. When making the ex-situ mixture, a thermosetting resin or prepolymer is blended with a surfactant, non-condensible gas forming reactants or water. Once injected into the formation, heat is applied to the mixture which causes it to rise to a temperature sufficient to foam the mixture and make a rigid foam between formation intervals. The thermosetting resin or prepolymer can be injected into a desired area of the formation along with a surfactant, other chemicals to elevate the temperature of the subsequently formed rigid foam, and water. The thermosetting resin or prepolymer can then be heated up to a temperature sufficient to cause a gas to be emitted from the reaction of the thermosetting resin reactants and water which gas foams the mixture. Alternatively, a non-condensible gas can be injected into the prepolymer from the surface.

Thermosetting foams can be made as is preferred from polymeric isocyanate. Polymeric isocyanates preferred for use herein include polyisocyanate, methyl phenyl diisocyanate, and polymethylene polyphenylisocyanate which is sold under the PAPI® trademark. When combined with water or a polyol, these polymeric isocyanates react to form a polyurethane polymer and a carbon dioxide gas. This polyurethane polymer is foamed by gas which is released by the reaction of a polymeric isocyanate and water or by addition of a non-condensible gas. Foaming is facilitated by the addition of a surfactant into the polyurethane polymer. PAPI isocyanate is the polymeric isocyanate preferred for use herein. PAPI isocyanate has a heat resistance quality. These foamed polymers can retain 70% of the strength measured at room temperature when exposed to 600° F. Inclusion of other chemicals increase the thermal stability to about 900° F. Polymeric isocyanates can be varied to produce foams with different structural properties.

Polyisocyanates are toxic and reactive chemicals. In order to facilitate handling of these chemicals, a quasi-prepolymer is used to reduce the reaction time and facilitate handling as a significant decrease is caused in the vapor pressure. This is due to the termination of reactive end groups with tertiary butyl alcohol. This deactivates the compound at low temperatures and facilitates handling.

Polymeric isocyanate can be included in an excess of water and a surfactant to generate a prepolymer and carbon dioxide gas. Once activated, the prepolymer can react with water or polyol in the reservoir. This reaction reduces the water saturation and decreases the thermal conductivity of a subsequently formed rigid foam. Where reservoir conditions make it undesirable to utilize a carbon dioxide gas to expand the polymer, another non-condensible gas can be used to prefoam the mixture prior to or after injection into the formation. A foam stabilizing surfactant can be added to the mixture in an amount of from about 0.1 to about 2 volume percent. The gas content of the foam reactants will depend upon the desired gas content of the polymer foam, the temperature, and the pressure in the formation.

Urethane chemistry and processing are discussed extensively in several publications. One such publication is *Rigid Plastic Foams* by T. H. Ferrigno which was published by Reinhold in 1967. Another publication is by W. E. Drizer entitled *Plastics Chemistry and Technology* which was published by Reinhold Company in 1979. Polyurethane foams are also discussed in *Polyurethane Foams: Technology, Properties, and Applications* by A. H. Landrock which was published in 1969 by the Plastics Technical Evaluation Center. As mentioned above, polyurethane is formed by the reaction of an isocyanate and a polyol. Carbon dioxide is evolved to foam the resulting polymer. The reaction occurs very fast; however, a quasi-prepolymer foaming process can be employed to yield a heat-activated chemical system for delayed foaming. This delayed action system can be obtained by partial blocking of the prepolymer with tertiary butyl alcohol.

Polyols which can be used to react with the polymeric isocyanates include polypropylene glycol, propoxylated glycerine, propoxylated ethylene diamine, propoxylated sucrose, and aromatic amine.

Surfactants can be used to facilitate foaming of the polymer. A preferred surfactant to be used herein is a silicone surfactant which can be obtained from Dow Corning, Union Carbide, or General Electric Company.

Non-condensible gases which can be used herein include in addition to carbon dioxide, nitrogen and fluorocarbons, especially trichlorofluoromethane and dichlorodifluoromethane. Trichlorofluoromethane and dichlorodifluoromethane are preferred. Blowing agents can also be used to provide in-situ gas liberation. Preferred agents are azodicarbonamide and dinitrosopentamethylene tetramine. Blowing agents are discussed in U.S. Pat. Nos. 4,848,465 and 4,848,468 which issued to Hazlett and Hazlett et al. on July 18, 1989, respectively. These patents are hereby incorporated by reference herein.

Although the preferred foam for utilization herein is comprised of polyurethane, other thermosetting foam resins or prepolymers can be used as long as they can withstand typical environmental conditions existing during thermal enhanced oil recovery operations. These thermosetting resins or prepolymers include one-component polyurethanes, polyisocyanurates, Urea formaldehyde, polystyrene, phenolics, and vinyl. As is preferred however, a blocked quasi-prepolymer made from PAPI resin or prepolymer, additional polyol, surfactant, and possibly water or a non-condensible gas can be blended and injected into a formation above or below a potentially productive petroleum or hydrocarbon fluid bearing zone.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A method for reducing thermal conductivity and heat loss between zones of a formation or reservoir comprising:

(a) placing a foamable mixture into at least one zone of a formation adjacent to a second zone that can undergo thermal stimulation which mixture is sufficient to form a rigid foam layer which mixture comprises
  (i) a thermosetting foamable resin or prepolymer, and
  (ii) a means for foaming said resin;
(b) allowing said mixture to remain in said zone for a time sufficient for said mixture to react from a temperature rise in the second zone thereby forming a rigid layer sufficient to reduce thermal conductivity and heat loss from said second zone.

2. The method as recited in claim 1 where in step (a) (i), the foamable mixture comprises a polyisocyanate combined with a polyol, and in step (a) (ii), the foaming means comprises a chemical blowing agent sufficient to cause delayed foaming of isocyanate and said polyol in-situ.

3. The method as recited in claim 1 where in step (a) (i), the foamable mixture comprises a polyisocyanate, a polyol, and tertiary-butyl alcohol sufficient to cause delayed foaming of polyisocyanate and said polyol.

4. The method as recited in claim 1 where the temperature rise is by thermal stimulation in said second zone.

5. The method as recited in claim 1 where the foamable mixture forms a foam which is stabilized by a surfactant that is added to said mixture.

6. The method as recited in claim 1 where in step (a) (i), the foamable mixture comprises a polymethylene polyphenylisocyanate prepolymer of step (a) (i), and a polyol.

7. The method as recited in claim 1 where the foamable mixture comprises a blocked quasi-polymethylene polyphenylisocyanate prepolymer in step (a) (i), an amount of polyol sufficient to react with the prepolymer, and a foam stabilizing surfactant.

8. The method as recited in claim 1 where the foamable mixture comprises a blocked quasi-polymethylene polyphenylisocyanate prepolymer in step (a) (i), an amount of polyol sufficient to react with the prepolymer, a foam stabilizing surfactant, water, or a noncondensible gas.

9. The method as recited in claim 1 where in step (b) the temperature rise results from injecting steam or initiating an in-situ combustion process.

10. A method for reducing thermal conductivity and heat loss between zones of a formation or reservoir comprising:
  (a) placing a foamable mixture into at least one zone of a formation adjacent to a second zone that is undergoing thermal stimulation which mixture is sufficient to form a rigid foam layer and which mixture comprises
    (i) polymethylene polyphenylisocyanate, and
    (ii) polyol in an amount sufficient to liberate gas sufficient to cause a foam to form in an aqueous environment; and
  (b) allowing said mixture to remain in said zone for a time sufficient for said mixture to react from a temperature rise in the second zone thereby forming a rigid foam layer sufficient to reduce thermal conductivity and heat loss from said second zone.

11. The method as recited in claim 10 where in step (a) said polyol reacts with water in the formation thereby reducing water saturation and substantially reducing thermal conductivity therein.

12. The method as recited in claim 10 where in step (a) (i), tertiary butyl alcohol is added to said mixture in an amount sufficient to deactivate polymethylene polyphenylisocyanate at temperature less than about 150° C.

13. The method as recited in claim 10 where in step (a) the foamable mixture comprises a blocked quasi-polymethylene polyphenylisocyanate prepolymer, an amount of polyol sufficient to react with the prepolymer, a foam stabilizing surfactant, water, or a non-condensible gas.

14. The method as recited in claim 10 where in step (b) the temperature rise results from injecting steam or initiating an in-situ combustion process.

15. The method as recited in claim 10 where the foam retains about 70% of its strength measured at room temperature when exposed to a temperature of about 600° F.

* * * * *